United States Patent [19]
de Queiroz

[11] Patent Number: 6,167,153
[45] Date of Patent: Dec. 26, 2000

[54] METHOD OF COMPRESSING JPEG FILES

[75] Inventor: Ricardo L. de Queiroz, Pittsford, N.Y.

[73] Assignee: Xerox Corporation, Stamford, Conn.

[21] Appl. No.: 09/119,023

[22] Filed: Jul. 20, 1998

[51] Int. Cl.$^7$ ..................................................... G06K 9/00
[52] U.S. Cl. ........................... 382/166; 382/166; 382/170
[58] Field of Search ..................................... 382/166, 170, 382/171, 197, 232, 233, 235, 251, 244; 358/426

[56] References Cited

U.S. PATENT DOCUMENTS

| | | | |
|---|---|---|---|
| 4,910,608 | 3/1990 | Whiteman | 358/433 |
| 5,166,987 | 11/1992 | Kageyama | 382/56 |
| 5,642,438 | 6/1997 | Babkin | 382/250 |
| 5,699,170 | 12/1997 | Yokose et al. | 358/426 |
| 5,703,965 | 12/1997 | Fu et al. | 382/232 |
| 5,737,450 | 4/1998 | Hajjahmad et al. | 382/260 |
| 5,745,251 | 4/1998 | Yamagami | 358/426 |
| 5,838,823 | 11/1998 | Ancessi | 382/232 |

FOREIGN PATENT DOCUMENTS

| | | |
|---|---|---|
| 0 853 420 A2 | 7/1998 | European Pat. Off. . |
| 96/17478 | 6/1996 | WIPO . |

*Primary Examiner*—Jerome Grant, II
*Assistant Examiner*—Negussie Worku

[57] ABSTRACT

A method and apparatus for compressing digital image data to improve the efficiency of serial data transmission is disclosed. More specifically, the present invention accomplishes image compression by performing the most complex portions of a standard compression technique on a subset of the originally provided data. The invention includes a fast JPEG compressor based on a modified two-dimensional discrete cosine transform.

9 Claims, 7 Drawing Sheets

| P 00 | P 01 | P 02 | P 03 | P 04 | P 05 | P 06 | P 07 |
|---|---|---|---|---|---|---|---|
| P 10 | P 11 | P 12 | P 13 | P 14 | P 15 | P 16 | P 17 |
| P 20 | P 21 | P 22 | P 23 | P 24 | P 25 | P 26 | P 27 |
| P 30 | P 31 | P 32 | P 33 | P 34 | P 35 | P 36 | P 37 |
| P 40 | P 41 | P 42 | P 43 | P 44 | P 45 | P 46 | P 47 |
| P 50 | P 51 | P 52 | P 53 | P 54 | P 55 | P 56 | P 57 |
| P 60 | P 61 | P 62 | P 63 | P 64 | P 65 | P 66 | P 67 |
| P 70 | P 71 | P 72 | P 73 | P 74 | P 75 | P 76 | P 77 |

*FIG. 3*

| | | | | 106 | | | |
|---|---|---|---|---|---|---|---|
| DCC 00 | ACC 01 | ACC 02 | ACC 03 | ACC 04 | ACC 05 | ACC 06 | ACC 07 |
| ACC 10 | ACC 11 | ACC 12 | ACC 13 | ACC 14 | ACC 15 | ACC 16 | ACC 17 |
| ACC 20 | ACC 21 | ACC 22 | ACC 23 | ACC 24 | ACC 25 | ACC 26 | ACC 27 |
| ACC 30 | ACC 31 | ACC 32 | ACC 33 | ACC 34 | ACC 35 | ACC 36 | ACC 37 |
| ACC 40 | ACC 41 | ACC 42 | ACC 43 | ACC 44 | ACC 45 | ACC 46 | ACC 47 |
| ACC 50 | ACC 51 | ACC 52 | ACC 53 | ACC 54 | ACC 55 | ACC 56 | ACC 57 |
| ACC 60 | ACC 61 | ACC 62 | ACC 63 | ACC 64 | ACC 65 | ACC 66 | ACC 67 |
| ACC 70 | ACC 71 | ACC 72 | ACC 73 | ACC 74 | ACC 75 | ACC 76 | ACC 77 |

*FIG. 4*

| QDCC 00 | QACC 01 | QACC 02 | QACC 03 | QACC 04 | QACC 05 | QACC 06 | QACC 07 |
|---|---|---|---|---|---|---|---|
| QACC 10 | QACC 11 | QACC 12 | QACC 13 | QACC 14 | QACC 15 | QACC 16 | QACC 17 |
| QACC 20 | QACC 21 | QACC 22 | QACC 23 | QACC 24 | QACC 25 | QACC 26 | QACC 27 |
| QACC 30 | QACC 31 | QACC 32 | QACC 33 | QACC 34 | QACC 35 | QACC 36 | QACC 37 |
| QACC 40 | QACC 41 | QACC 42 | QACC 43 | QACC 44 | QACC 45 | QACC 46 | QACC 47 |
| QACC 50 | QACC 51 | QACC 52 | QACC 53 | QACC 54 | QACC 55 | QACC 56 | QACC 57 |
| QACC 60 | QACC 61 | QACC 62 | QACC 63 | QACC 64 | QACC 65 | QACC 66 | QACC 67 |
| QACC 70 | QACC 71 | QACC 72 | QACC 73 | QACC 74 | QACC 75 | QACC 76 | QACC 77 |

METHOD OF COMPRESSING JPEG FILES

The present invention is directed to a method and apparatus for compressing digital image data to improve the efficiency of serial data transmission. More specifically, the invention accomplishes image compression by implementing a fast JPEG compressor based on a modified two-dimensional discrete cosine transform.

BACKGROUND OF THE INVENTION

The transmission of electronic data via facsimile machines and similar devices has become quite common. Efforts to transmit significantly larger volumes of this data within a substantially shortened period of time are constantly being made. This is true not only to allow for data to be sent from one location to another at faster speeds and thereby causing less inconvenience to the user, but to enable more complex data to be transmitted between the same locations without drastically increasing the required transmission time. For example the facsimile transmission time for a detailed halftoned image will be many times more than that of a simple sheet of black text on a white page when using the same fax machine. By the same token, fax transmission of a color image will require an even greater amount of time than its greatly detailed halftoned counterpart.

Without any form of data reduction, transmission of color image data files via facsimile would require extensive resources—very fast modems and/or large buffers—and would still take a great deal of time, thereby causing such transmission to become very expensive and therefore, impractical. Instead, the transmission of color image data via fax is typically accomplished using some form of data compression prior to transmission.

The JPEG (Joint Photographic Experts Group) standard provides a well known method of compressing electronic data. JPEG uses the discrete cosine transform (DCT) to map space data into spatial frequency domain data. Simply put, the first step in JPEG compression is to transform an 8×8 block of pixels into a set of 8×8 coefficients using the DCT. The DCT with the lowest frequency is referred to as the DC coefficient (DCC), and the remaining coefficients are AC coefficients (ACCs). The DCC and ACCs are quantized—divided by an integer referred to as the "step size" and rounded to the nearest whole number. The losses that occur during JPEG compression typically occur during the quantization step. The magnitude of this loss is obviously dependent upon the step size selected and the resulting amount of roundoff required to perform quantization.

Next, the quantized coefficients are arranged in a one dimensional vector by following a selected path (i.e. zigzag) through the 8×8 block of quantized coefficients. The DCC is typically the first value in the vector. Ordinary JPEG compression typically includes replacing the quantized DCC with the difference of its actual value minus the DCC of the previous block, to provide a differential DCC. Finally, the vector is encoded into a bit stream through a sequence of Run Length Counting (RLC) operations, combined with Variable Length Codes (VLC) to produce a compressed data stream.

Fax transmission of color image data is often accomplished by scanning the image at the sending fax to generate digital color image data, subjecting this digital color image data to JPEG compression and then transmitting the compressed digital color image data over telephone lines to the receiving fax. Since color image data is so complex, high compression ratios must usually be applied in order to complete the transmission within an acceptable time frame. High compression ratios lead to more data loss, which typically occurs at the higher end of the frequency range. Further, the imaging devices typically included with fax machines in the lower end of the market usually include thermal ink-jet printers and would likely use error diffusion halftoning techniques. The halftoning that occurs when using a thermal ink jet printer results in an additional loss of high frequency data. Thus, much of the detail in the original image that is preserved and transmitted will never actually be viewed by the ultimate user.

The "sending" portion of fax transmission includes scanning the original image, generation of a corresponding digital image, and any one of a number of data reduction techniques, most notably some form of data compression. Once these steps are completed, the compressed data is transmitted serially to the receiving fax in a bit stream. The length of the bit stream used to describe the image is inversely proportional to the amount of compression that has been applied. Thus, if the compression ratio is large the length of the bit stream used to describe the image will be very short, resulting in a substantial reduction in the transmission time for the data stream.

With this in mind, successful fax transmission requires a proper correspondence between the compression ratio being applied to the image and the clock speed of CPU of the sending fax. In other words, if the compression ratio is smaller than necessary for a given CPU speed the data will have to wait to be transmitted, and an appropriately sized buffer will be required. On the other hand, if the compression ratio is high relative to the CPU speed the modem will become idle waiting for the CPU to complete image processing and transmit more data. Since modems are typically configured to detect a large lapse in data transmission as the end of transmission, this large gap typically causes them to disconnect. Thus, it is advantageous to continue the stream of data from the sending fax to the receiving fax, and eliminate gaps in the data stream. One way to do this is obviously to implement a faster JPEG compressor which can keep the data moving through the modem even if a high compression ratio is used. However, this solution results in significant cost increases and is often impractical. Thus, it is advantageous to provide a continuous stream of data during transmission of a color facsimile by implementing a faster data compressor without having to resort to the purchase of more expensive equipment.

The following disclosures may be relevant to aspects of the present invention:

U.S. Pat. No. 5,745,251 to Yamagami issued Apr. 28, 1998 relates to a video signal recording apparatus for recording a video signal in such a manner that the video signal is compressed before it is recorded. The apparatus includes a first coding device for coding input image data into code data having a variable length; a second coding device for coding code data having the variable length and coded by the first coding device into code data having a fixed length; and a memory for storing code data coded by the first coding device.

U.S. Pat. No. 5,737,450 to Hajjahmad et al. issued Apr. 7, 1998 discloses a method and apparatus for applying an image filter to an image signal where image data terms, corresponding to the image signal, are converted by means of an overlapping operation and a scaled forward orthogonal transformation to form frequency coefficient matrices, the image filter is converted by means of a descaled orthogonal transformation to form a descaled frequency filter matrix, and the frequency coefficient matrices are multiplied by the descaled frequency filter matrix to form filtered coefficient matrices for conversion into a filtered image signal by means of an inverse orthogonal transformation process.

U.S. Pat. No. 5,703,965 to Fu et al. issued Dec. 30, 1997, discloses an image processing method wherein an image represented in a first image array of pixels is first decimated in two dimensions before being compressed by a predefined compression algorithm such as JPEG. Another possible predefined compression algorithm can involve a wavelet technique. The compressed, reduced image is then transmitted over the limited bandwidth transmission medium, and the transmitted image is decompressed using an algorithm which is an inverse of the predefined compression algorithm (such as reverse JPEG). The decompressed, reduced image is then interpolated back to its original array size. Edges (contours) in the image are then sharpened to enhance the perceptual quality of the reconstructed image. Specific sharpening techniques are described.

U.S. Pat. No. 5,699,170 to Yokose et al. issued Dec. 16, 1997, discloses an image communication system wherein transmission of an image between an image transmission apparatus and an image reception apparatus which include image output sections having different performances can be performed without making an inquiry for the performance prior to transmission is disclosed. An image is inputted by an image input section and sent to a hierarchization section in the image transmission apparatus. The hierarchization section converts the inputted image into hierarchic communication data and transmits hierarchized data to a selection section of the image reception apparatus. The selection section extracts only necessary data from the hierarchic communication data transmitted thereto in accordance with the performance of an image output section of the image reception section and then sends the necessary data to the image output section after, if necessary, they are converted into image data. The image output section visualize the image data transmitted thereto from the selection section.

U.S. Pat. No. 5,642,438 to Babkin issued Jun. 24, 1997 discloses image compression implementing a fast two-dimensional discrete cosine transform. More specifically, Babkin discloses a method and apparatus for the realization of two-dimensional discrete cosine transform (DCT) for an 8×8 image fragment with three levels of approximation of DCT coefficients.

All of the references cited herein are incorporated by reference for their teachings.

Accordingly, although known apparatus and processes are suitable for their intended purposes, a need remains for image compression implementing a two-dimensional discrete cosine transform using a fast JPEG compressor based on a modified two-dimensional discrete cosine transform to compress digital image data thereby improving the efficiency of serial data transmission.

SUMMARY OF THE INVENTION

In accordance with one aspect of the invention there is provided a method of improving the speed and efficiency of electronic data compression, which includes: obtaining a pixel value matrix, wherein the pixel value matrix represents the light intensity of an image; segmenting the pixel matrix into a plurality of sub-matrices; representing each sub-matrix with a value in an approximate value matrix; and transforming the approximate value matrix into a coefficient matrix.

In accordance with another aspect of the invention there is provided a method of improving the speed and efficiency of JPEG compression, including: obtaining a pixel value matrix, wherein the pixel value matrix represents the light intensity of an image; segmenting the pixel matrix into a plurality of sub-matrices; representing each sub-matrix with a value in an approximate value matrix; transforming the approximate value matrix into a coefficient matrix; quantizing the coefficient matrix; converting the quantized coefficient matrix into a one dimensional vector; and encoding the one dimensional vector into a bit stream of digital image data descriptive of the digital image.

In accordance with yet another aspect of the invention there is provided a method of transmitting a facsimile of an original image from a sending location to a receiving location, which includes: acquiring the original image and generating digital image data therefrom; deriving a pixel value matrix from the digital image data, wherein the pixel value matrix represents a light intensity of the original image; segmenting the pixel matrix into a plurality of sub-matrices; representing each sub-matrix with a value in an approximate value matrix; transforming the approximate value matrix into a coefficient matrix; quantizing the coefficient matrix; converting the quantized coefficient matrix into a one dimensional vector; encoding the one dimensional vector into a bit stream of digital image data which describes the original digital image; transmitting the bit stream over communication lines to a compatible device at the receiving location; and outputting the digital image data at an output device.

The present invention deals with a common problem in digital image processing systems—obtaining an effective yet cost efficient way to supply a continuous stream of complex image data from a sending fax to a receiving fax. One way to solve this problem includes providing a proper correspondence between the compression ratio that is applied to the image data and the clock speed of CPU of the transmitting fax.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for compressing complex digital image data to enhance the efficiency of data transmission.

Figure 1:
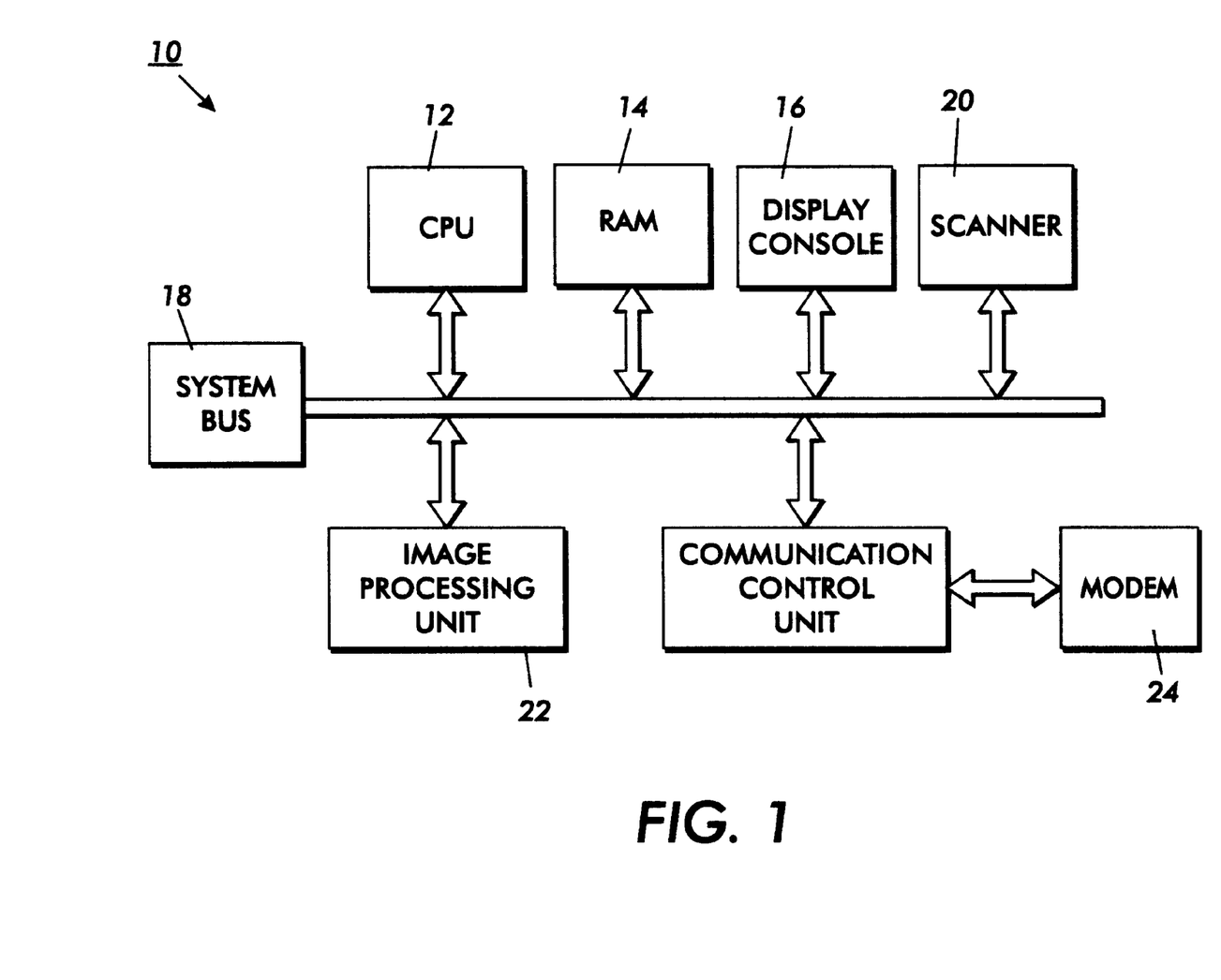
FIG. 1 is a generalized block diagram illustrating general aspects of a facsimile machine that may be used to practice the present invention.

Referring now to the drawings where the showings are for the purpose of describing an embodiment of the invention and not for limiting same, FIG. 1 is a block diagram showing structure of an embodiment of a facsimile (fax) apparatus 10 according to the present invention. Fax 10 includes a CPU 12 for executing controlling processes and facsimile transmission control procedures, a RAM 14 for controlling programs and a display console 16 with various buttons and/or switches for controlling the facsimile apparatus and LCDs or LEDs for reviewing the status of system operation. A scanner 20 is also included for acquiring an original image and generating image data therefrom. Image processing unit 22 is included to perform encoding and decoding (compression and decompression) processes between an image signal and transmitted codes. Significantly for purposes of this invention, fax 10 includes or interfaces with a modem 24, which is a modulating and demodulating device that transmits and receives picture information over telephone lines to a compatible receiving device 26, such as another facsimile machine, a printer, computer terminal or similar apparatus.

Figure 2:
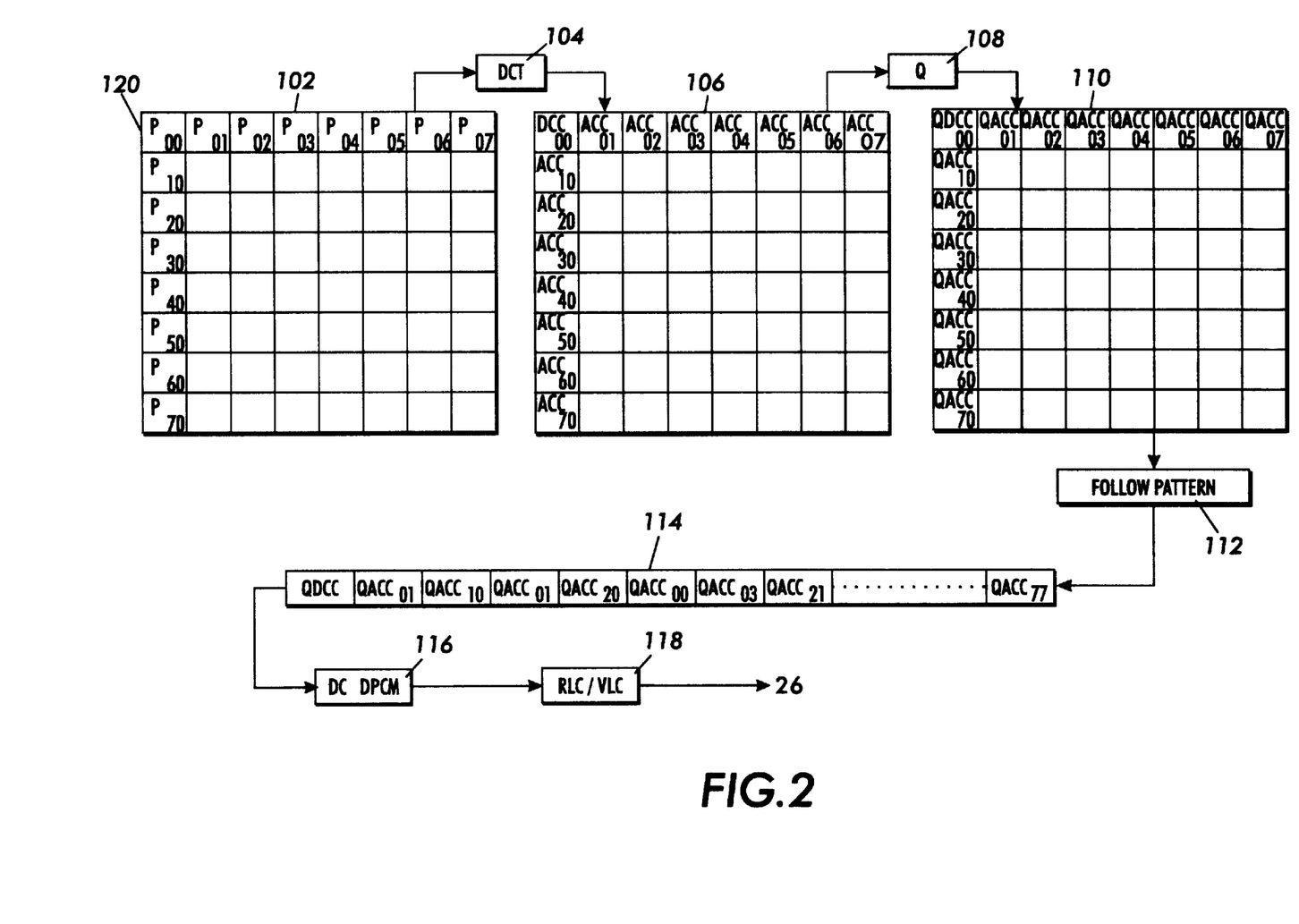
FIG. 2 contains a schematic illustration of the steps used to carry out a JPEG compression scheme.

As stated above, image processing unit 22 is used to compress and decompress image signals and transmitted codes. One common method of compressing and decompressing image signals is through use of the JPEG (Joint Photographic Experts Group) standard described in detail with reference to FIG. 2. An original image is scanned by fax 10 to generate a corresponding digital image. The digital image is separated into 8×8 blocks 102 of picture elements 120 or "pixels" which indicate the intensity of the light that is measured at discrete intervals throughout the surface of the page. For example, a spot that is covered with black ink will not reflect any light. The value of the pixel 120 will typically be 0 at that location. On the other hand, a spot that is completely uncovered by ink will reflect the color of the page on which the image resides. Assuming the sheet paper on which the image has been placed is white, the measured light intensity of the pixel 120 would be 1 at that spot. Gray areas, such as those which represent color or black and white halftoned areas of the image would register a light intensity somewhere between 0 and 1. The values of the pixels 120 in block 102 are transformed through DCT into a set 106 of 8×8 coefficients as indicated in step 104. The DCT coefficient with the lowest frequency is referred to as the DC coefficient (DCC), and the remaining coefficients are AC coefficients (ACCs). The DCC and ACCs are quantized— each coefficient is divided by a predetermined whole number referred to as the "step size" at step 108 and then a selected pattern (usually a "zigzag") is followed through the 8×8 block of quantized coefficients 110 as indicated in step 112 to place the coefficients in a desired order in a one dimensional vector 114. The quantized DCC is typically the first value of the vector 114, and is represented differentially as the actual DCC value minus the DCC of the previous block as shown in block 116. Vector 114 is encoded into a bit stream through a sequence of Run Length Counting (RLC) operations which count the number of zero ACCs that reside in the path before a non-zero ACC. These RLC operations are combined with Variable Length Codes (VLC) as indicated in block 118 which encode a symbol that includes a combination of the number of zeros preceding a non-zero ACC and the ACC amplitude. This encoding produces a compressed data stream which can be transmitted to receiving device 26 over communication lines.

Figure 3:
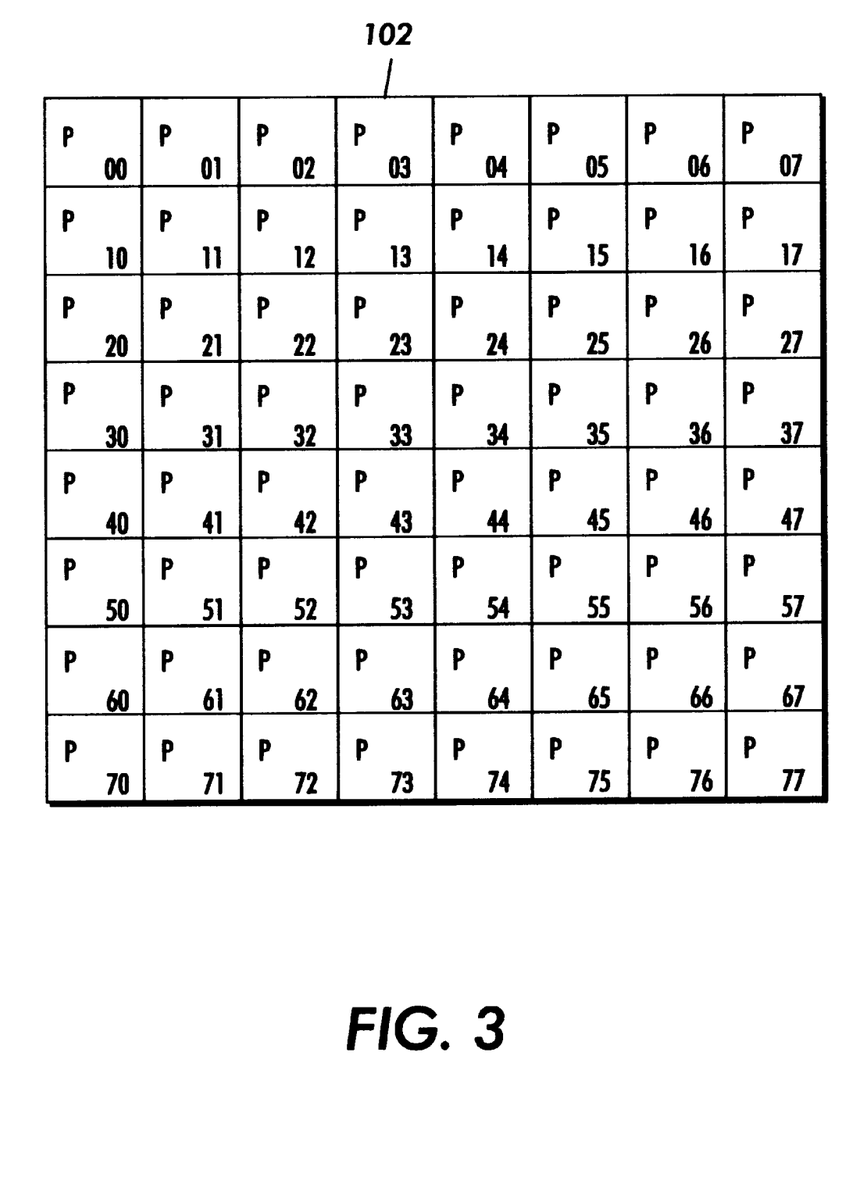
FIG. 3 is a detailed illustration of an example of a labeling configuration of an 8×8 block of pixels.
Figure 4:
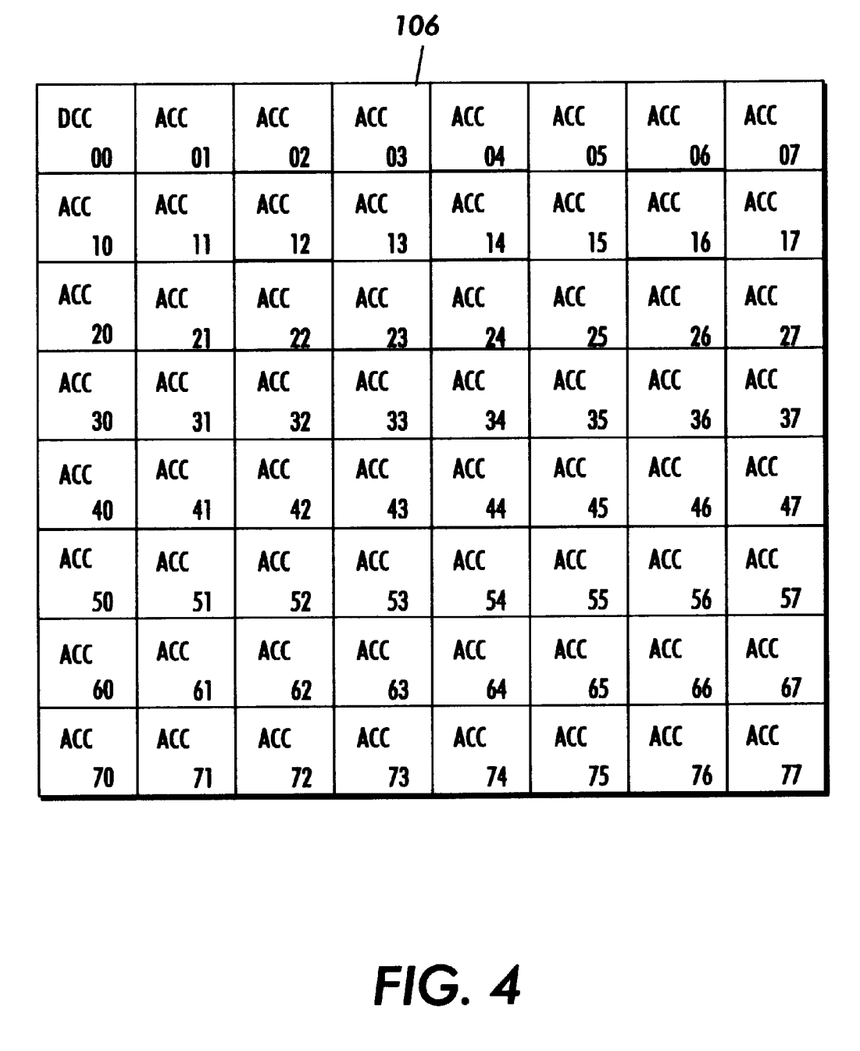
FIG. 4 contains a detailed illustration of the labeling configuration of DCT coefficients obtained by application of a discrete cosine transformation to the 8×8 block of pixels illustrated in FIG. 3.
Figure 5:
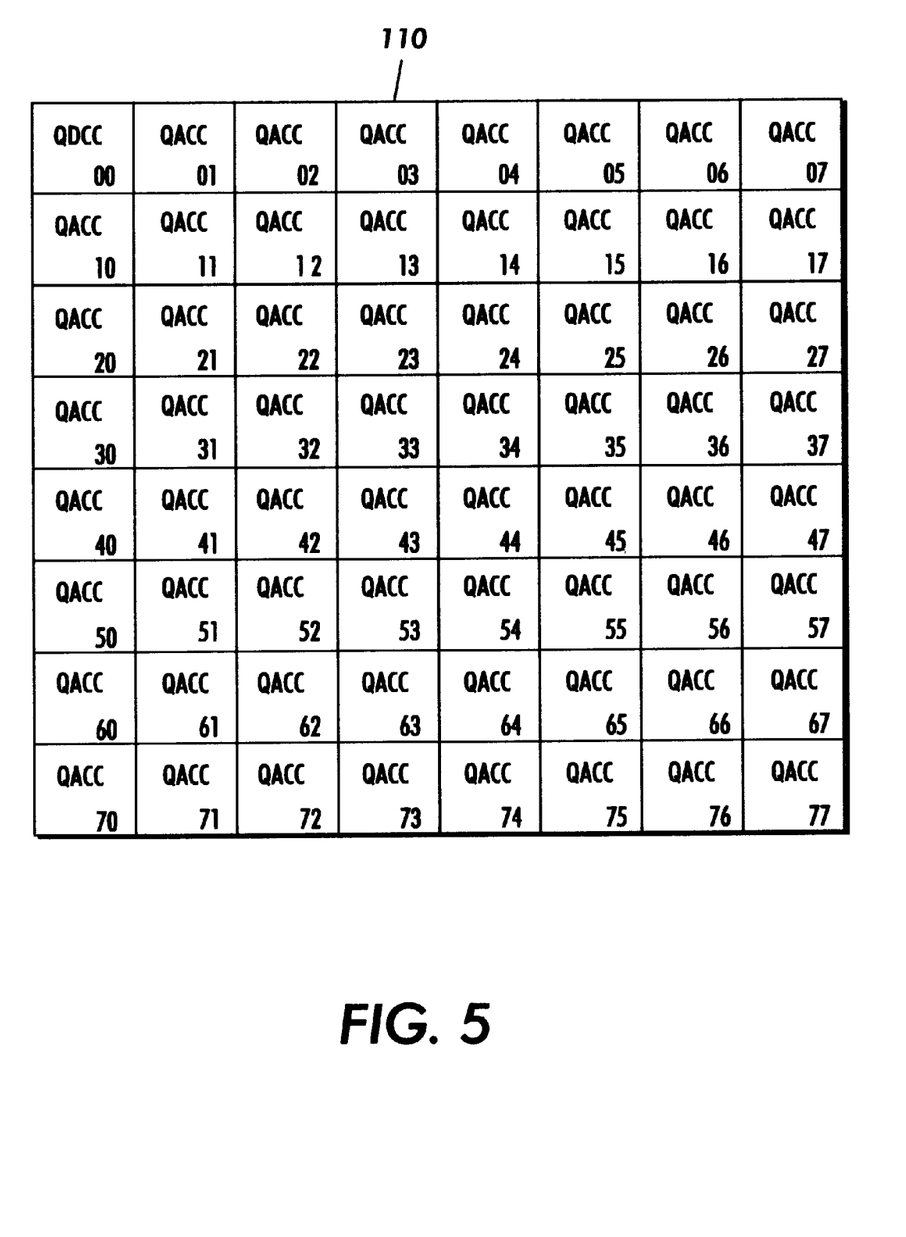
FIG. 5 illustrates one example of the manner in which the DCT coefficients of FIG. 4 may be labeled after quantization.

FIG. 3 contains a detailed illustration of an 8×8 block of pixels 120 and the labeling configuration that will be used throughout the description of the present invention. It should be noted here that pixels 120 and pixel blocks 102 can be labeled in numerous other ways and it is not intended to imply that either JPEG compression or the present invention are limited to the ordering scheme shown here. Similarly, FIGS. 4 and 5 contain detailed illustrations of the unquantized and quantized DCT coefficients respectively that correspond to the 8×8 block 102 of pixels 120 illustrated in FIG. 3. Again, neither standard JPEG compression or the present invention are limited to these embodiments.

Figure 6:
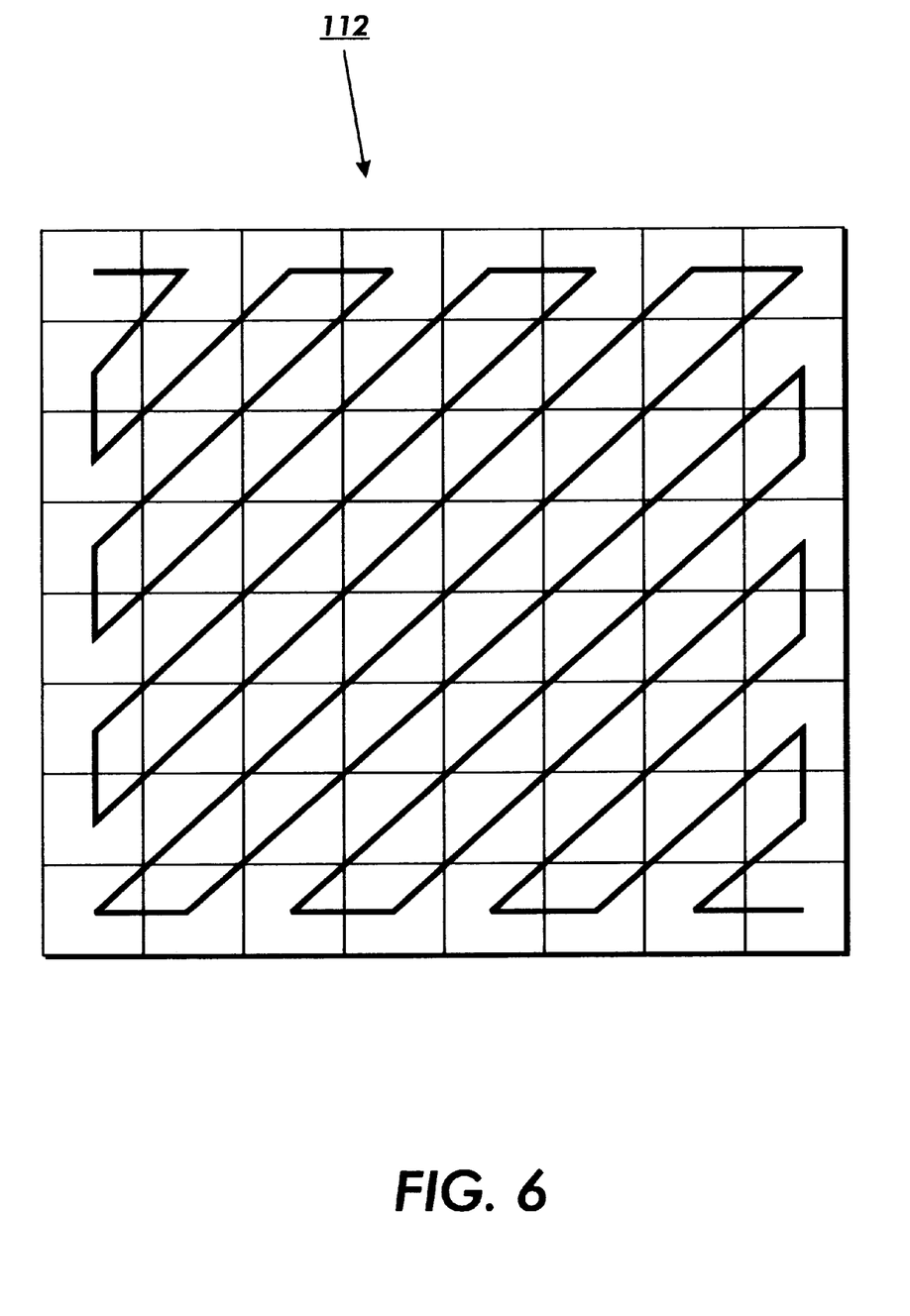
FIG. 6 depicts a "zig zag" pattern, one embodiment of the manner in which quantized pixels may be selected for placement into a one dimensional vector.

FIG. 6 contains a detailed illustration of one pattern 112 in which the quantized DCT coefficients may be selected for placement into one dimensional vector 114. As those skilled in the at will recognize, the illustration shown in FIG. 6 merely shows one of many possible zigzag coefficient selection patterns 112 that may be followed in order to practice the present invention.

Figure 7:
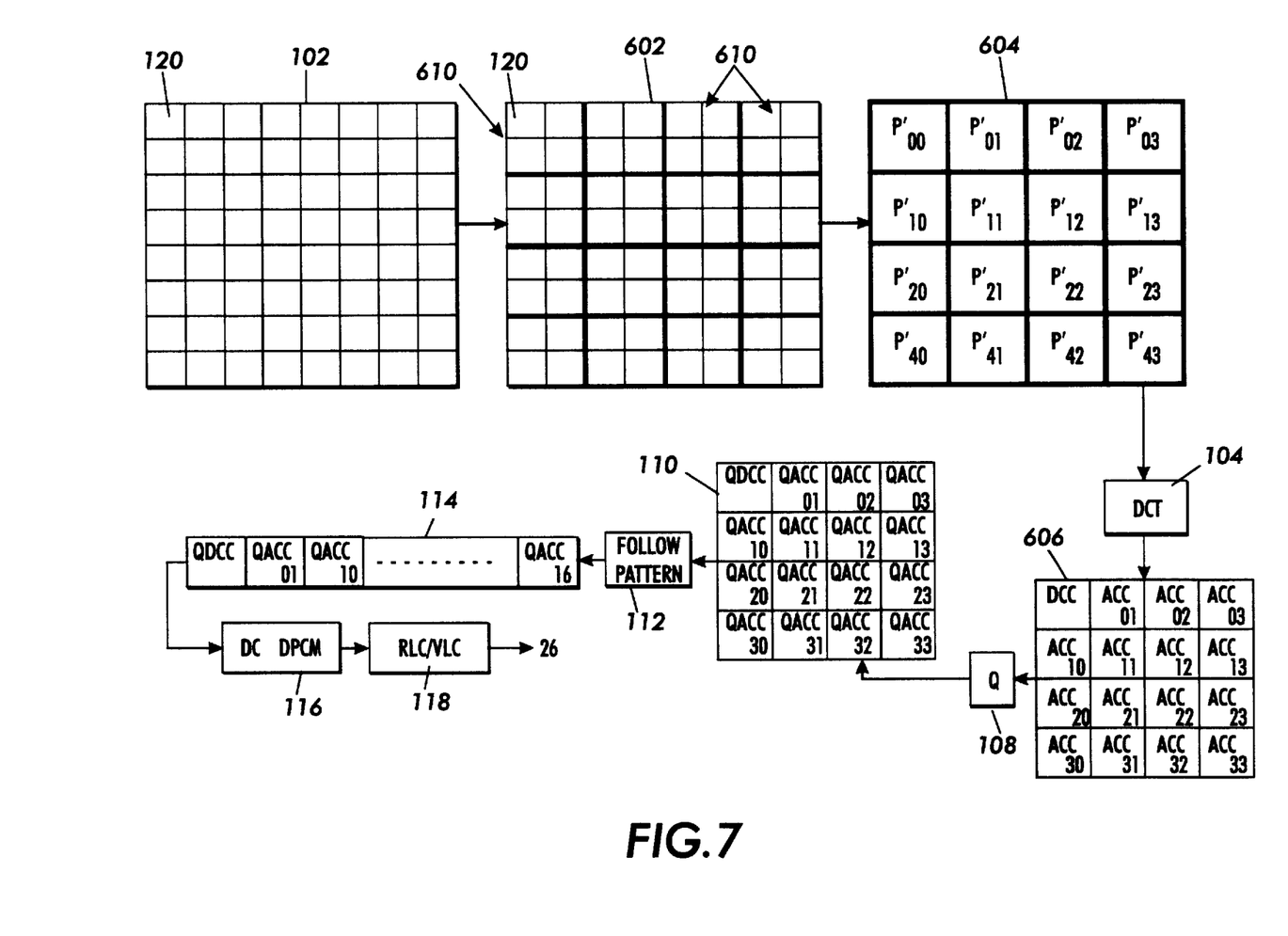
FIG. 7 contains a schematic illustration of one way the present invention may be implemented in a JPEG compression technique.

Referring now to FIG. 7, generally speaking the present invention includes performing a portion of the JPEG compression method on a reduced set of data without producing a substantial loss in the quality of the output image. As before, the scanned image is separated into blocks 102 of pixels 120 which indicate the intensity of the light at the various locations of the image. As with the standard JPEG method described above, an 8×8 block of pixels has shown to be very successful when used with the present invention. But also as before, other pixel block dimensions are possible and the invention is not limited to this embodiment. Those skilled in the art will recognize that a smaller or larger block size might be chosen when it is desired to preserve more or less image detail. In fact it should be noted that while the horizontal and vertical dimensions are identical in the embodiment of pixel block 102 described here, this is not a requirement for practicing the present invention. For example, a non-square block might be chosen if the image was generated for a device possessing asymmetric resolutions in the vertical and horizontal directions.

Once pixel block 102 having the appropriate size and dimensions is chosen, block 102 must be segmented into sub-blocks 610 as indicated in step 602. When an 8×8 block of pixels was used to practice the present invention, segmenting pixel block 102 into 16 sub-blocks 610, with each sub-block 610 having two pixels 120 in the horizontal direction and two pixels 120 in the vertical direction was shown to be very successful. Those of ordinary skill in the art will recognize that if the user of the invention wishes to sacrifice some image reproduction accuracy in order to save costs, four sub-blocks with 4 pixels in each direction might be used. If the user wishes to obtain higher image reproduction accuracy in some areas of the image, but requires less accuracy in other areas, a fine grid could be applied to some areas with a larger grid applied to other areas. Again, it is intended to embrace all such alternatives, and the invention is not limited to the examples provided here.

With continued reference to FIG. 7, the present invention next requires representing each of the above described sub-blocks 610 shown in step 602 with an appropriate value in an approximation block 604. In the embodiment illustrated sub-block 610 which includes pixels $P_{00}$, $P_{01}$, $P_{10}$ and $P_{11}$ would be represented as $P'_{00}$ in approximation block 604. There are numerous options for representing a sub-block 610 with an appropriate value in approximation block 604. In one embodiment of the invention the average value of all pixels 120 contained in the designated sub-block 610 ($P_{00}$, $P_{01}$, $P_{10}$, $P_{10}$) is placed at the corresponding location ($P'_{00}$) in approximation block 604. In another embodiment, additional computation time was preserved by adding the values of all pixels 120 in the designated sub-block, and placing that sum in the proper location in approximation block 604.

Still referring to FIG. 7, a scaled four point DCT is next performed on approximation block 604 in order to transform it into a coefficient block 606. The scaling factor for the 4-point DCT is only necessary to normalize the DCT coefficients again, making them compatible with the coefficients which would be obtained from an 8-point DCT. Scaling of DCT coefficients can typically be incorporated in the quantization step. The DCT approximation causes the values which represent the lowest frequencies of all pixels 120 pixel block 102 to be retained as the values of coefficient block 606.

When each pixel sub-block 610 is comprised of the average of all pixels 120 contained therein, these 4×4 lowest frequency coefficients can be approximated by:

$$Y_{4\times4} = 2 D_4 X_{4\times4} D^T_4$$

where $D_4$ is the 4-point DCT matrix $X_{4\times4}$ is the 4×4 subsampled block, and the superscript denotes transposition of a matrix. In other words, $D^T_4$ is what results when a transposition is performed on matrix $D_4$.

When pixel sub-blocks 610 are represented by the sum of the values of its pixels 120, the 4×4 lowest frequency coefficients can be approximated by:

$$Y_{4\times4} = \tfrac{1}{2}(D_4 X'_{4\times4} D^T_4)$$

where $X'_{4\times4} = 4 X_{4\times4}$

Coefficient block 606 can then be used in the JPEG compression scheme described above if one merely derives digital image data from the coefficient block 606, and transmits it over telephone lines to a receiving device, such as another facsimile machine 10, a digital computer terminal, and video display or printer. In other words, the present invention could easily be adapted for use in a JPEG compression method by quantizing coefficient block 606, converting the quantized coefficient block 606 into a one dimensional vector 114, and encoding one dimensional vector 114 into a bit stream of digital image data that describes the original image from which pixels 120 were derived. The "zigzag" method described above and illustrated in FIG. 6 is also quite useful with the present invention and has shown to be a successful embodiment. As before, other embodiments are possible and the invention is not limited to this manner of converting the coefficient block 606 to vector 114.

The preferred embodiment of the present invention is use in a method of transmitting a facsimile of an original color image from a sending location to a receiving location. The entire method includes inputting the original image into the fax machine, and digitizing the original image to generate digital color image data. As in a standard JPEG compression scheme, a pixel matrix or "block" 102 is then derived from the digital image data. The present invention may then be employed to divide pixel block 102 into multiple sub-matrices or "sub-blocks" 610. The invention substantially reduces the amount of time that would be required for JPEG compression because it performs the most complicated operations on a reduced amount of data, notably on a set of numbers that are derived from sub-blocks 610.

As explained earlier, one advantage of the present invention is the ability to tailor the size and shape of the blocks and sub-blocks to the needs of the user. Thus, if the CPU and other supporting hardware permits, smaller blocks 102 and/or sub-blocks 610 can be used to transmit images that include great amounts of detail. If maintaining detail in the reproduced image is not a concern, larger blocks 102 and/or sub-blocks 610 can be used. If an image that has significant detail in some areas of the image, but is blank or quieter in other areas, the invention can be adapted to use small blocks 102 and/or sub-blocks 610 in some areas and large blocks 102 and/or sub-blocks 610 in other areas.

Once sub-blocks 610 are composed, a representative value is calculated and placed in an appropriate location in an pseudo-matrix or "approximation block" 604. Some examples of this representative value include, but are not limited to the average, sum, maximum, minimum or mean value of all pixels in the designated sub-block 610.

Once the approximate value block 604 is obtained, a discrete cosine transformation is performed on it, thereby generating a matrix 606 of DCT coefficients. One successful embodiment of the invention applied a scaled four point discrete cosine transformation. In the same manner the method can be extended to include other sizes. Generically speaking the initial matrix is converted to an N×N matrix which undergoes a scaled N point DCT. N can be any integer between 1 and 8. The resulting coefficient matrix 606 must then be quantized, followed by conversion of quantized matrix 110 into a one dimensional vector 114.

It should be noted here that if the DCT transformation involves less than the original 64 samples, the other steps involved in the present invention can also be optimized by taking into account less than 64 samples. For example in an 8×8 sub-block, if N×N samples are transformed (with n <8), only N×N samples will be quantized and scanned into a one-dimensional vector. The remaining samples (i.e. the remaining 8×8−N×N samples) will automatically be generated as 0s. Similarly the RLC operations are also simplified as samples outside the region of the valid N×N DCT coefficients and are known to be zero. This simplifies the process of counting zero-valued ACCs, or identifying the last known zero ACCs (end of block symbol).

Finally, successful transmission of a facsimile of an original color image from the sending location to the receiving location requires encoding one dimensional vector 114 into a bit stream of digital image data which describes the original digital image, transmitting the bit stream over communication lines, most commonly telephone lines, to the appropriate compatible device at the receiving location, and outputting the digital image data at an output device 26 (i.e. fax, computer terminal, video display, printer).

It is, therefore, apparent that there has been provided in accordance with the present invention, a method and apparatus for fast compression of JPEG files that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of improving the speed and efficiency of ADCT electronic data compression, comprising:

a) obtaining input image data which includes discrete values representing light intensity in an image;

b) generating approximation data which provides an estimated value of said image light intensity represented in said input image data, including:
  i) segmenting said input image data to form a plurality of image data blocks;
  ii) partitioning said image data block into a plurality of image data sub-blocks, each representing a plurality of pixel; and
  iii) representing each image data sub-block as a single value in an approximation data block for said plurality of pixels;
c) from said approximation data, generating a compressed image data file, including:
  i) transforming said approximation data into a block of ADCT coefficients;
  ii) quantizing said coefficient block;
  iii) arranging said quantized coefficient block into a one dimensional vector; and
  iv) encoding said one dimensional vector into a bit stream, to produce said output image data; and
d) transmitting said output image data, derived from said approximation data, via a communication medium to a receiving device.

2. A method of improving the speed and efficiency of electronic data compression as claimed in claim 1 wherein said representing step further comprises for each image data sub-block, assigning an average of all discrete values contained therein to a corresponding value in said approximate value data block.

3. A method of improving the speed and efficiency of electronic data compression as claimed in claim 1 wherein said representing step further comprises for each image data sub-block, assigning a sum of all discrete values contained therein to a corresponding value in said approximate value data block.

4. A method of improving the speed and efficiency of electronic data compression as claimed in claim 1 wherein each image data block is a matrix which had eight discrete values extending in a horizontal direction and eight discrete values extending in a vertical direction.

5. A method of improving the speed and efficiency of electronic data compression as claimed in claim 4 wherein said partitioning step further comprises grouping said discrete values such that four values are included in each image data sub-block with two of said values extending in a horizontal direction and two of said values extending in a vertical direction, thereby resulting in sixteen image data sub-blocks in each of said image data blocks, with four sub-blocks extending in a horizontal direction and four sub-blocks extending in a vertical direction.

6. A method of improving the speed and efficiency of electronic data compression as claimed in claim 1 wherein said coefficient block is comprised of values which are the lowest frequency values of said input image data.

7. A method of improving the speed and efficiency of electronic data compression as claimed in 1 wherein said transforming step further comprises performing a scaled four point discrete cosine transform on said approximation data.

8. A method of transmitting a facsimile of an original image from a sending location to a receiving location comprising:
  a) acquiring the original image and generating digital image data therefrom, wherein said digital image data includes pixel values which represent the light intensity of the original image;
  b) generating approximation data which provides an estimated value of said image light intensity, wherein said generation includes
    i) segmenting said input image data to form a plurality of image data blocks;
    ii) partitioning said image data block into a plurality of image data sub-blocks: and
    iii) representing each image data sub-block as a single value in an approximation data block;
  c) deriving output image data from said approximation data; and
  d) transmitting said output image data over telephone lines to a receiving device; and
  e) outputting said digital image data at an output device which communicates with said receiving device
  wherein each image data block is a matrix which had eight discrete values extending in a horizontal direction and eight discrete values extending in a vertical direction.

9. A method of transmitting a facsimile of an original image from a sending location to a receiving location as claimed in claim 8 wherein said partitioning step further comprises grouping said discrete values such that four values are included in each image data sub-block with two of said values extending in a horizontal direction and two of said values extending in a vertical direction, thereby resulting in sixteen image data sub-blocks in each of said image data blocks, with four sub-blocks extending in a horizontal direction and four sub-blocks extending in a vertical direction.

* * * * *